(12) United States Patent
Abe

(10) Patent No.: US 11,393,411 B2
(45) Date of Patent: Jul. 19, 2022

(54) MULTI-DISPLAY SYSTEM AND METHOD FOR ADJUSTING MULTI-DISPLAY SYSTEM

(71) Applicant: Sharp NEC Display Solutions, Ltd., Tokyo (JP)

(72) Inventor: Masatoshi Abe, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/298,467

(22) PCT Filed: Dec. 7, 2018

(86) PCT No.: PCT/JP2018/045135
§ 371 (c)(1),
(2) Date: May 28, 2021

(87) PCT Pub. No.: WO2020/115905
PCT Pub. Date: Jun. 11, 2020

(65) Prior Publication Data
US 2022/0036836 A1 Feb. 3, 2022

(51) Int. Cl.
*G09G 3/34* (2006.01)
*G09G 5/10* (2006.01)

(52) U.S. Cl.
CPC ............. *G09G 3/3406* (2013.01); *G09G 5/10* (2013.01); *G09G 2300/026* (2013.01);
(Continued)

(58) Field of Classification Search
CPC .. G09G 3/3406; G09G 5/10; G09G 2300/026; G09G 2320/062; G09G 2320/0693
See application file for complete search history.

(56) References Cited

U.S. PATENT DOCUMENTS

| 6,292,157 | B1 * | 9/2001 | Greene | G09G 3/2003 345/1.3 |
| 2013/0088642 | A1 * | 4/2013 | Hsieh | G08C 17/02 348/563 |

(Continued)

FOREIGN PATENT DOCUMENTS

| JP | H05-83659 A | 4/1993 |
| JP | 2009-216808 A | 9/2009 |

(Continued)

OTHER PUBLICATIONS

International Search Report (ISR) (PCT Form PCT/ISA/210), in PCT/JP2018/045135, dated Feb. 5, 2019.

*Primary Examiner* — Antonio Xavier
(74) *Attorney, Agent, or Firm* — McGinn I.P. Law Group, PLLC.

(57) ABSTRACT

A multi-display system includes: a master display device; a first slave display device; an optical measuring instrument to measure luminance and color displayed by a first image display unit of the master display device; and a deterioration factor calculating unit to calculate a deterioration factor on the basis of a first set of measurement parameters, which represent the luminance and the color measured by the optical measuring instrument, and of initial values of the first set of measurement parameters. The master display device performs adjustment on the basis of the first set of measurement parameters. The first slave display device performs adjustment on the basis of a second set of measurement parameters of a second image display unit of the first slave display device, wherein the second set of measurement parameters are calculated from the deterioration factor and from initial values of the second set of measurement parameters.

11 Claims, 11 Drawing Sheets

(52) U.S. Cl.
CPC .............. *G09G 2320/062* (2013.01); *G09G 2320/0626* (2013.01); *G09G 2320/0693* (2013.01)

(56) References Cited

U.S. PATENT DOCUMENTS

| | | | |
|---|---|---|---|
| 2014/0104323 A1 | 4/2014 | Kenmochi | |
| 2015/0279037 A1* | 10/2015 | Griffin | G09G 5/006 345/1.3 |
| 2016/0231975 A1* | 8/2016 | Kim | G06F 3/1446 |
| 2016/0358582 A1* | 12/2016 | Lee | G09G 5/10 |
| 2019/0206299 A1* | 7/2019 | Kim | G09G 3/2003 |

FOREIGN PATENT DOCUMENTS

| | | |
|---|---|---|
| JP | 2012-123085 A | 6/2012 |
| JP | 2013-088696 A | 5/2013 |
| JP | 2018-109725 A | 7/2018 |
| WO | WO 2012/172637 A1 | 12/2012 |

\* cited by examiner

MULTI-DISPLAY SYSTEM AND METHOD FOR ADJUSTING MULTI-DISPLAY SYSTEM

TECHNICAL FIELD

The present invention relates to a multi-display system and a method of adjusting a multi-display system.

BACKGROUND ART

In display devices that display color, adjustment is periodically performed to maintain accuracy for exact color display, and thus consistency of color which is displayed by the display devices is guaranteed.

In the related art, in general, adjustment of display devices is individually performed for each display device. However, for example, a long time is required to individually adjust display devices on a desk. In a state in which a tiled matrix is realized, display devices may be provided at positions beyond an operator's reach (for example, at high positions) and it may be difficult to adjust display devices which are provided at positions beyond an operator's reach.

Patent Literature 1 discloses a multi-screen display device that corrects luminance unevenness and color shift in each screen of a multi-screen display including a plurality of screens and luminance unevenness and color shift between the screens. In the technique disclosed in Patent Literature 1, screens of a plurality of image display devices are combined to constitute a multi-screen display, whereby a multi-screen display device that displays an image on the multi-screen display is constituted. In each image display device, a luminance value is corrected by an image processing circuit such that luminance unevenness in the screen is corrected on the basis of information on luminance of a central portion of the screen and information on luminance of a peripheral portion stored in a memory circuit. Subsequently, the corrected luminance values are transmitted between the plurality of image display devices and a target luminance value which is a target of the entire multi-screen display is calculated on the basis thereof. The luminance values are further corrected on the basis of the calculated target luminance value by the image processing circuits of the image display devices.

In the technique, as illustrated in FIG. 7 of Patent Literature 1, it is necessary to measure the luminance of all of the plurality of screens constituting the multi-screen display device.

CITATION LIST

Patent Literature

[Patent Literature 1]
Japanese Unexamined Patent Application, First Publication No. 2012-123085

SUMMARY OF INVENTION

Technical Problem

An objective of the invention is to provide a multi-display system and a method of adjusting a multi-display system with which all of a plurality of display devices can be adjusted without measuring luminance and color which are displayed by all image display units of the plurality of display devices constituting the multi-display system.

Solution to Problem

According to an aspect of the invention, a multi-display system may include, but is not limited to, a master display device; a first slave display device that is different from the master display device; an optical measuring instrument configured to measure luminance and color which are displayed by a first image display unit of the master display device; and a deterioration factor calculating unit configured to calculate a deterioration factor on the basis of a first set of measurement parameters of the first image display unit of the master display device, where the first set of measurement parameters are parameters that represent the luminance and the color measured by the optical measuring instrument, and of initial values of the first set of measurement parameters of the first image display unit of the master display device. The master display device is configured to perform adjustment of the master display device on the basis of the first set of measurement parameters of the first image display unit of the master display device. The first slave display device is configured to perform adjustment of the first slave display device on the basis of a second set of measurement parameters of a second image display unit of the first slave display device, wherein the second set of measurement parameters are calculated from the deterioration factor calculated by the deterioration factor calculating unit and from initial values of the second set of measurement parameters of the second image display unit of the first slave display device.

According to another aspect of the invention, there is provided a method of adjusting a multi-display system including a master display device and a first slave display device. The method includes measuring luminance and color which are displayed by a first image display unit of a master display device; calculating a deterioration factor on the basis of a first set of measurement parameters of the first image display unit of the master display device, where the first set of measurement parameters are parameters that represent the luminance and the color measured and of initial values of the first set of measurement parameters of the first image display unit of the master display device, performing adjustment of the master display device on the basis of the first set of measurement parameters of the first image display unit of the master display device; calculating a second set of measurement parameters of a second image display unit of the first slave display device on the basis of the deterioration factor calculated and of initial values of the second set of measurement parameters of the image display unit of the first slave display device; and performing adjustment of the first slave display device on the basis of the second set of measurement parameters of the image display unit of the slave display device.

Advantageous Effects of Invention

According to the invention, it is possible to adjust all of a plurality of display devices without measuring luminance and color which are displayed by all image display units of the plurality of display devices constituting a multi-display system.

DESCRIPTION OF EMBODIMENTS

A general multi-display system will be described first before describing embodiments of a multi-display system and a method of adjusting a multi-display system according to the invention.

Figure 1:
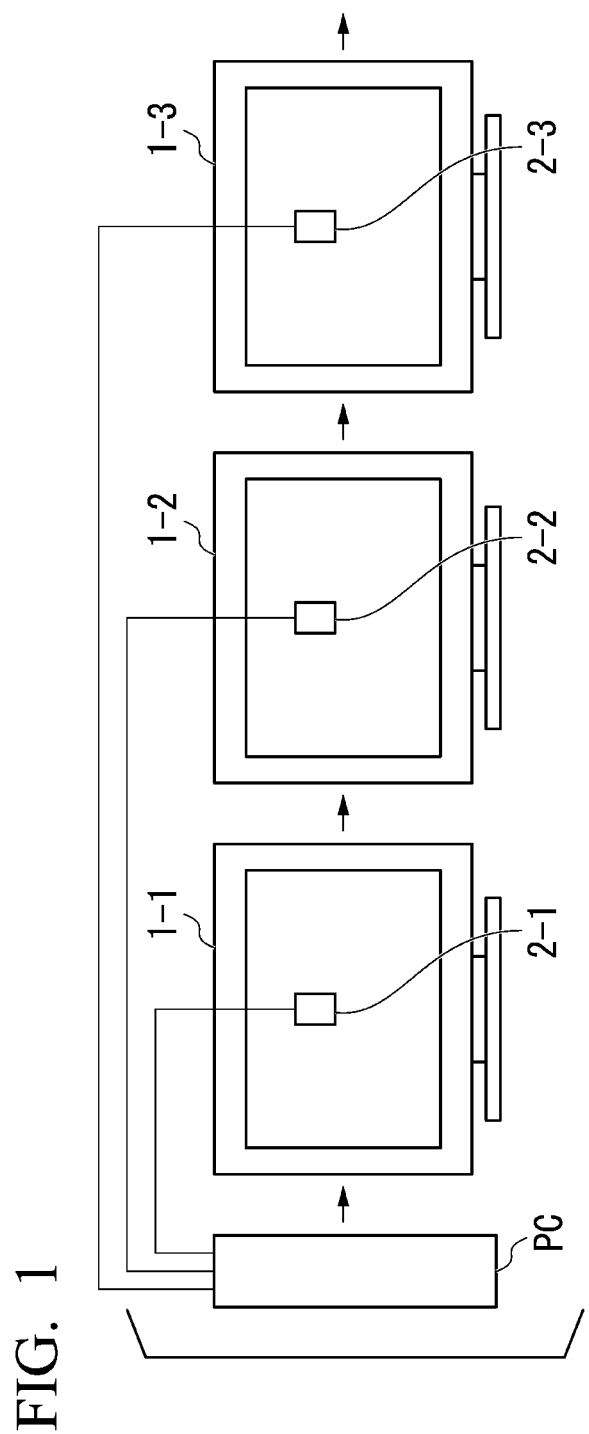
FIG. 1 is a diagram illustrating an example in which adjustment is performed in a general multi-display system.

FIG. 1 is a diagram illustrating an example in which adjustment is performed in a general multi-display system. Adjustment in a multi-display system means that adjustment is performed by measuring color, luminance, and the like which are displayed by the display devices using an optical measuring instrument such that a difference in coloring characteristics between display devices is corrected and the same color is reproduced in any display device.

In the example illustrated in FIG. 1, a multi-display system includes a display device 1-1, a display device 1-2, and a display device 1-3.

When adjustment is performed, an optical measuring instrument 2-1 that is connected to a personal computer PC measures luminance and color which are displayed by an image display unit of the display device 1-1. Measurement parameters of the image display unit of the display device 1-1 are parameters that represent the measured luminance and color. The measurement parameters include, for example, a tri-stimulus value (XYZ), a tri-stimulus value (Yxy), and measurement parameters of another optical measuring instrument. The display device 1-1 performs adjustment of the display device 1-1 on the basis of the measurement parameters (for example, a tri-stimulus value) of the image display unit of the display device 1-1.

An optical measuring instrument 2-2 that is connected to the personal computer PC measures luminance and color which are displayed by an image display unit of the display device 1-2. The display device 1-2 performs adjustment of the display device 1-2 on the basis of the measurement parameters (for example, a tri-stimulus value) of the image display unit of the display device 1-2 constituting the luminance and the color measured by the optical measuring instrument 2-2.

Similarly, an optical measuring instrument 2-3 that is connected to the personal computer PC measures luminance and color which are displayed by an image display unit of the display device 1-3. The display device 1-3 performs adjustment of the display device 1-3 on the basis of the measurement parameters (a tri-stimulus value) of the image display unit of the display device 1-3 constituting the luminance and the color measured by the optical measuring instrument 2-3.

That is, when adjustment of a general multi-display system is performed, it is necessary to provide the optical measuring instruments 2-1, 2-2, and 2-3 for all the plurality of display devices 1-1, 1-2, and 1-3. Accordingly, for example, when the optical measuring instruments 2-1, 2-2, and 2-3 need to be provided at positions beyond an operator's reach (beyond an adjustment performer's reach), it is difficult to perform adjustment.

Hereinafter, embodiments of a multi-display system and a method of adjusting a multi-display system according to the invention will be described with reference to the accompanying drawings.

Figure 2:
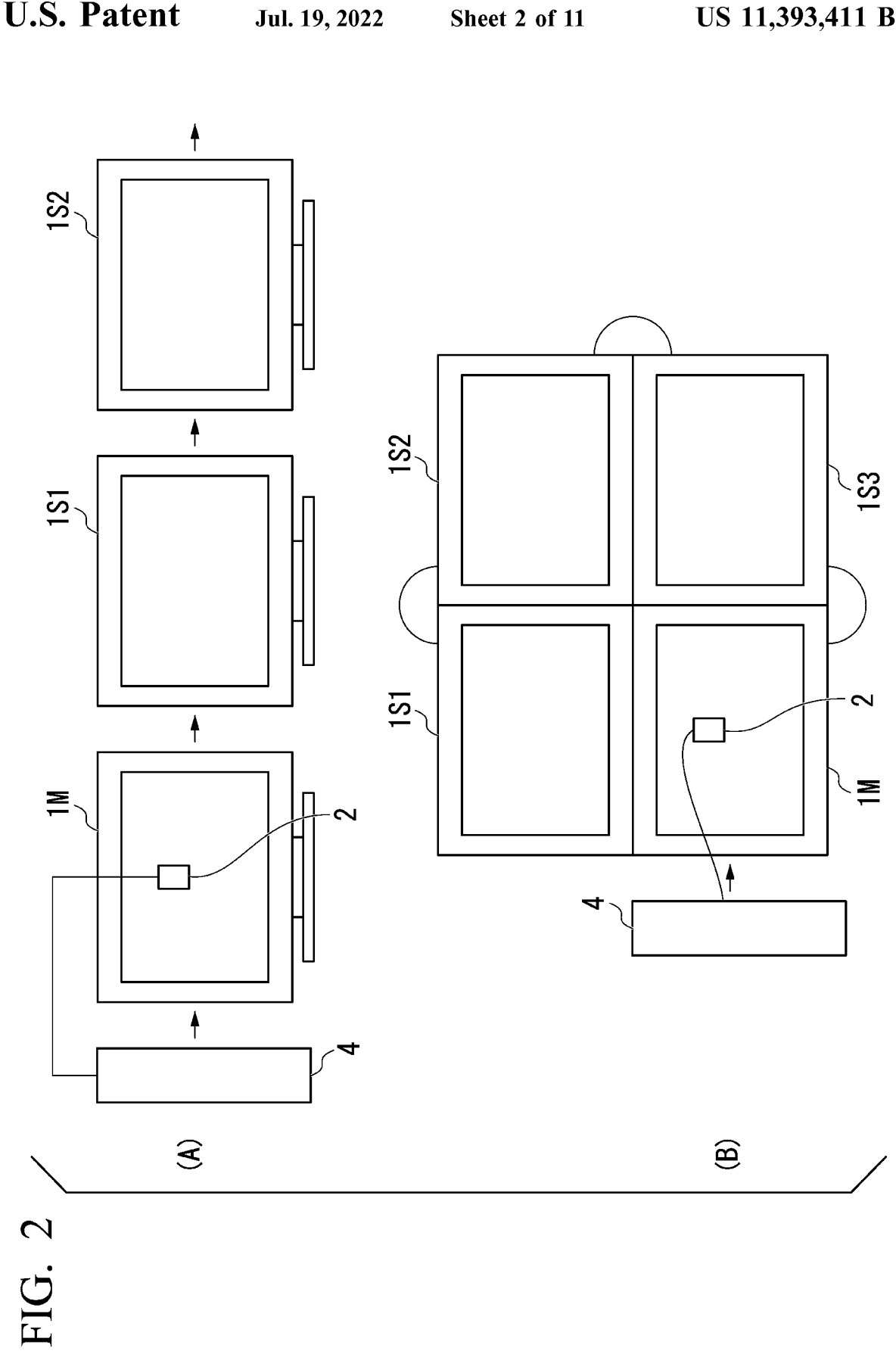
FIG. 2 is a diagram illustrating an example in which adjustment is performed in a multi-display system according to a first embodiment.

FIG. 2 is a diagram illustrating an example in which adjustment is performed in a multi-display system according to a first embodiment. Specifically, FIG. 2(A) illustrates a first example of a configuration in which adjustment of the multi-display system according to the first embodiment is performed and FIG. 2(B) illustrates a second example of the configuration in which adjustment of the multi-display system according to the first embodiment is performed.

In the example illustrated in FIG. 2(A), a multi-display system includes a master display device 1M, a slave display device 1S1, a slave display device 1S2, an optical measuring instrument 2, and a deterioration factor transmitting receiving unit 4. The master display device 1M constitutes a part of the multi-display system. The slave display device 1S1 and the slave display device 1S2 constitute other parts of the multi-display system.

In the example illustrated in FIG. 2(A), the slave display device 1S1 and the slave display device 1S2 have the same configuration as the master display device 1M. In another example, the slave display device 1S1 or the slave display device 1S2 may have a configuration different from that of the master display device 1M.

In the example illustrated in FIG. 2(A), the optical measuring instrument 2 measures luminance and color which are displayed by an image display unit 13 (see FIG. 3) of the master display device 1M. For example, tri-stimulus values X1, Y1, and Z1 of the image display unit 13 of the master display device 1M are measurement parameters that represent the luminance and the color displayed by the image display unit 13 of the master display device 1M. Luminance and color which are displayed by an image display unit of the slave display device 1S1 are not measured by the optical measuring instrument 2. Tri-stimulus values X1$a$, Y1$a$, and Z1$a$ of the image display unit of the slave display device 1S1 are measurement parameters that represent the luminance and the color displayed by the image display unit of the slave display device 1S1.

Luminance and color which are displayed by an image display unit of the slave display device 1S2 are not measured by the optical measuring instrument 2. Tri-stimulus values X1$b$, Y1$b$, and Z1$b$ of the image display unit of the slave display device 1S2 are measurement parameters that represent the luminance and the color displayed by the image display unit of the slave display device 1S2. The deterioration factor transmitting receiving unit 4 receives deterioration factors γx, γy, and γz which are calculated by a deterioration factor calculating unit 3 (see FIG. 3) from the master display device 1M and transmits the received deterioration factors γx, γy, and γz to the slave display device 1S1 and the slave display device 1S2.

In the example illustrated in FIG. 2(B), a multi-display system includes a master display device 1M, a slave display device 1S1, a slave display device 1S2, a slave display device 1S3, an optical measuring instrument 2, and a deterioration factor transmitting receiving unit 4. The master display device 1M constitutes a part of the multi-display system. The slave display devices 1S1, 1S2, and 1S3 constitute other parts of the multi-display system.

In the example illustrated in FIG. 2(B), the slave display device 1S1, 1S2, or 1S3 has the same configuration as the master display device 1M. In another example, the slave display device 1S1, 1S2, or 1S3 may have a configuration different from that of the master display device 1M.

In the example illustrated in FIG. 2(B), the optical measuring instrument 2 measures luminance and color which are displayed by an image display unit 13 (see FIG. 3) of the master display device 1M. For example, tri-stimulus values X1, Y1, and Z1 of the image display unit 13 of the master display device 1M are measurement parameters that represent the luminance and the color displayed by the image display unit 13 of the master display device 1M. Luminance and color which are displayed by an image display unit of the slave display device 1S1 are not measured by the optical measuring instrument 2. Tri-stimulus values X1a, Y1a, and Z1a of the image display unit of the slave display device 1S1 are measurement parameters that represent the luminance and the color displayed by the image display unit of the slave display device 1S1. Luminance and color which are displayed by an image display unit of the slave display device 1S2 are not measured by the optical measuring instrument 2. Tri-stimulus values X1b, Y1b, and Z1b of the image display unit of the slave display device 1S2 are measurement parameters that represent the luminance and the color displayed by the image display unit of the slave display device 1S2. Similarly, luminance and color which are displayed by an image display unit of the slave display device 1S3 are not measured by the optical measuring instrument 2. Tri-stimulus values X1c, Y1c, and Z1c of the image display unit of the slave display device 1S3 are measurement parameters that represent the luminance and the color displayed by the image display unit of the slave display device 1S3.

The deterioration factor transmitting receiving unit 4 receives deterioration factors γx, γy, and γz which are calculated by the deterioration factor calculating unit 3 (see FIG. 3) from the master display device 1M and transmits the received deterioration factors γx, γy, and γz to the slave display devices 1S1, 1S2, and 1S3.

Figure 3:
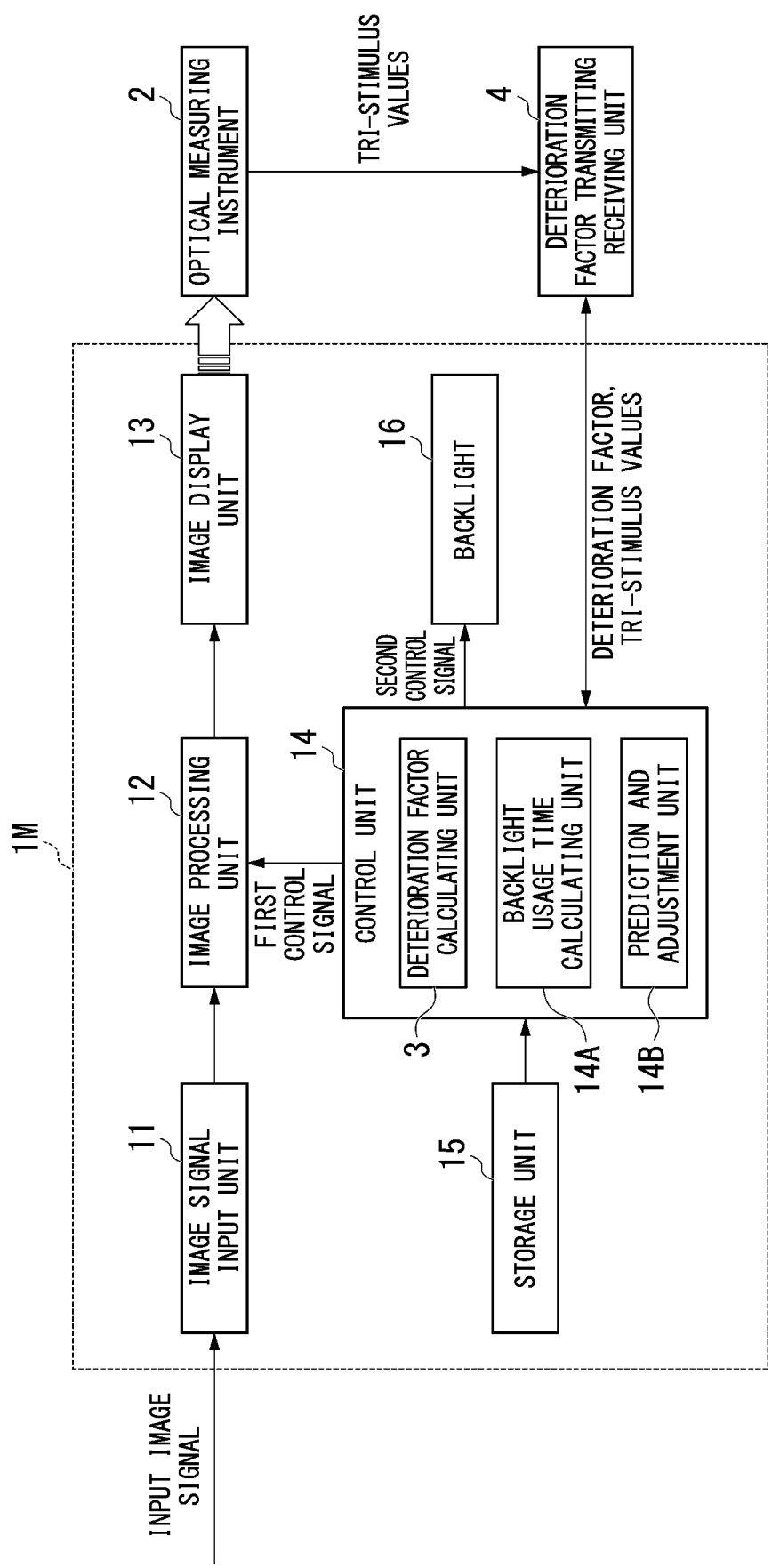
FIG. 3 is a diagram illustrating an example of a relationship between a master display device, an optical measuring instrument, and a deterioration factor transmitting receiving unit which are illustrated in FIGS. 2(A) and 2(B).

FIG. 3 is a diagram illustrating an example of a relationship between the master display device 1M, the optical measuring instrument 2, and the deterioration factor transmitting receiving unit 4 which are illustrated in FIGS. 2(A) and 2(B).

In the example illustrated in FIG. 3, the master display device 1M includes an image signal input unit 11, an image processing unit 12, an image display unit 13, a control unit 14, a storage unit 15, and a backlight 16. An input image signal is input to the image signal input unit 11 from the outside of the master display device 1M. The image signal input unit 11 outputs the input image signal without any change. The image processing unit 12 processes the input image signal input from the image signal input unit 11. The image display unit 13 displays an image processed by the image processing unit 12.

The control unit 14 generates a first control signal for controlling the image processing unit 12 and transmits the first control signal to the image processing unit 12. The control unit 14 generates a second control signal for controlling the backlight 16 (a control signal for controlling brightness) and transmits the second control signal to the backlight 16.

The storage unit 15 stores initial values X0, Y0, and Z0 of tri-stimulus values which are the measurement parameters of the image display unit 13. The initial values X0, Y0, and Z0 are, for example, tri-stimulus values which are the measurement parameters of the image display unit 13 of the master display device 1M and which constitute the luminance and the color measured by an optical measuring instrument of a manufacturing factory (not illustrated) at the time of adjustment of the master display device 1M in the manufacturing factory of the master display device 1M.

The backlight 16 is controlled on the basis of the second control signal generated by the control unit 14 and lights the image display unit 13.

In the example illustrated in FIG. 3, the deterioration factor transmitting receiving unit 4 receives data of tri-stimulus values X1, Y1, and Z1 which are the measurement parameters of the image display unit 13 from the optical measuring instrument 2. The control unit 14 receives data of the tri-stimulus values X1, Y1, and Z1 which are the measurement parameters of the image display unit 13 from the deterioration factor transmitting receiving unit 4. The control unit 14 includes a deterioration factor calculating unit 3, a backlight usage time calculating unit 14A, and a prediction and adjustment unit 14B.

The deterioration factor calculating unit 3 calculates deterioration factors γx (=X1/X0), γy (=Y1/Y0), and γz (=Z1/Z0) on the basis of the tri-stimulus values X1, Y1, and Z1 which are the measurement parameters of the image display unit 13 and the initial values X0, Y0, and Z0 of the tri-stimulus values which are the measurement parameters of the image display unit 13. The control unit 14 generates the first control signal and the second control signal on the basis of the deterioration factors γx, γy, and γz calculated by the deterioration factor calculating unit 3. For example, when deterioration of the image display unit 13 is progressing, the control unit 14 generates the first control signal for compensating for the deterioration of the image display unit 13. For example, when deterioration of the backlight 16 is progressing, the control unit 14 generates the second control signal for compensating for the deterioration of the backlight 16. The storage unit 15 stores the deterioration factors γx, γy, and γz calculated by the deterioration factor calculating unit 3.

In the example illustrated in FIG. 3, the backlight usage time calculating unit 14A calculates a usage time of the backlight 16 (specifically, a cumulative usage time). The deterioration factor calculating unit 3 interpolates the deterioration factors γx, γy, and γz, which are calculated on the basis of the tri-stimulus values X1, Y1, and Z1 which are the measurement parameters of the image display unit 13 and the initial values X0, Y0, and Z0 of the tri-stimulus values which are the measurement parameters of the image display unit 13, on the basis of the usage time of the backlight 16 calculated by the backlight usage time calculating unit 14A. That is, the deterioration factor calculating unit 3 calculates the deterioration factors γx, γy, and γz on the basis of the usage time of the backlight 16 in addition to the tri-stimulus values X1, Y1, and Z1 which are the measurement parameters of the image display unit 13 and the initial values X0, Y0, and Z0 thereof.

The prediction and adjustment unit 14B predicts and adjusts luminance and/or color shift of the image display unit 13.

In the example illustrated in FIGS. 2(A) and 3, data of the tri-stimulus values X1, Y1, and Z1 which are the measurement parameters of the image display unit 13 of the master display device 1M is transmitted to the control unit 14 of the master display device 1M via the deterioration factor transmitting receiving unit 4.

The master display device 1M performs adjustment of the master display device 1M on the basis of the tri-stimulus values X1, Y1, and Z1 which are the measurement parameters of the image display unit 13 of the master display device 1M.

The control unit 14 of the master display device 1M calculates the deterioration factors γx, γy, and γz on the basis of the tri-stimulus values X1, Y1, and Z1 which are the measurement parameters of the image display unit 13 and the initial values X0, Y0, and Z0 of the tri-stimulus values which are the measurement parameters of the image display unit 13 and which are stored in the storage unit 15.

In the example illustrated in FIGS. 2(A) and 3, the deterioration factors γx, γy, and γz calculated by the control unit 14 of the master display device 1M are transmitted to the slave display device 1S1 via the deterioration factor transmitting receiving unit 4. A control unit (not illustrated) of the slave display device 1S1 calculates tri-stimulus values X1a (=γx×X0a), Y1a (=γy×Y0a), and Z1a (=γz×Z0a) which are the measurement parameters of the image display unit of the slave display device 1S1 on the basis of the deterioration factors γx, γy, and γz and the initial values X0a, Y0a, and Z0a of the tri-stimulus values which are the measurement parameters of an image display unit (not illustrated) of the slave display device 1S1 stored in a storage unit (not illustrated) of the slave display device 1S1.

The slave display device 1S1 performs adjustment of the slave display device 1S1 on the basis of the tri-stimulus values X1a, Y1a, and Z1a which are the measurement parameters of the image display unit of the slave display device 1S1.

That is, the slave display device 1S1 can perform adjustment of the slave display device 1S1 without actually measuring luminance and color which are displayed by the image display unit of the slave display device 1S1.

In the example illustrated in FIGS. 2(A) and 3, the deterioration factors γx, γy, and γz calculated by the control unit 14 of the master display device 1M are transmitted to the slave display device 1S2 via the deterioration factor transmitting receiving unit 4 and the slave display device 1S1. A control unit (not illustrated) of the slave display device 1S2 calculates tri-stimulus values X1b (=γx×X0b), Y1b (=γy×Y0b), and Z1b (=γz×Z0b) which are the measurement parameters of the image display unit of the slave display device 1S2 on the basis of the deterioration factors γx, γy, and γz and the initial values X0b, Y0b, and Z0b of the tri-stimulus values which are the measurement parameters of an image display unit (not illustrated) of the slave display device 1S2 stored in a storage unit (not illustrated) of the slave display device 1S2.

The slave display device 1S2 performs adjustment of the slave display device 1S2 on the basis of the tri-stimulus values X1b, Y1b, and Z1b which are the measurement parameters of the image display unit of the slave display device 1S2.

That is, the slave display device 1S2 can perform adjustment of the slave display device 1S2 without actually measuring luminance and color which are displayed by the image display unit of the slave display device 1S2.

Figure 4:
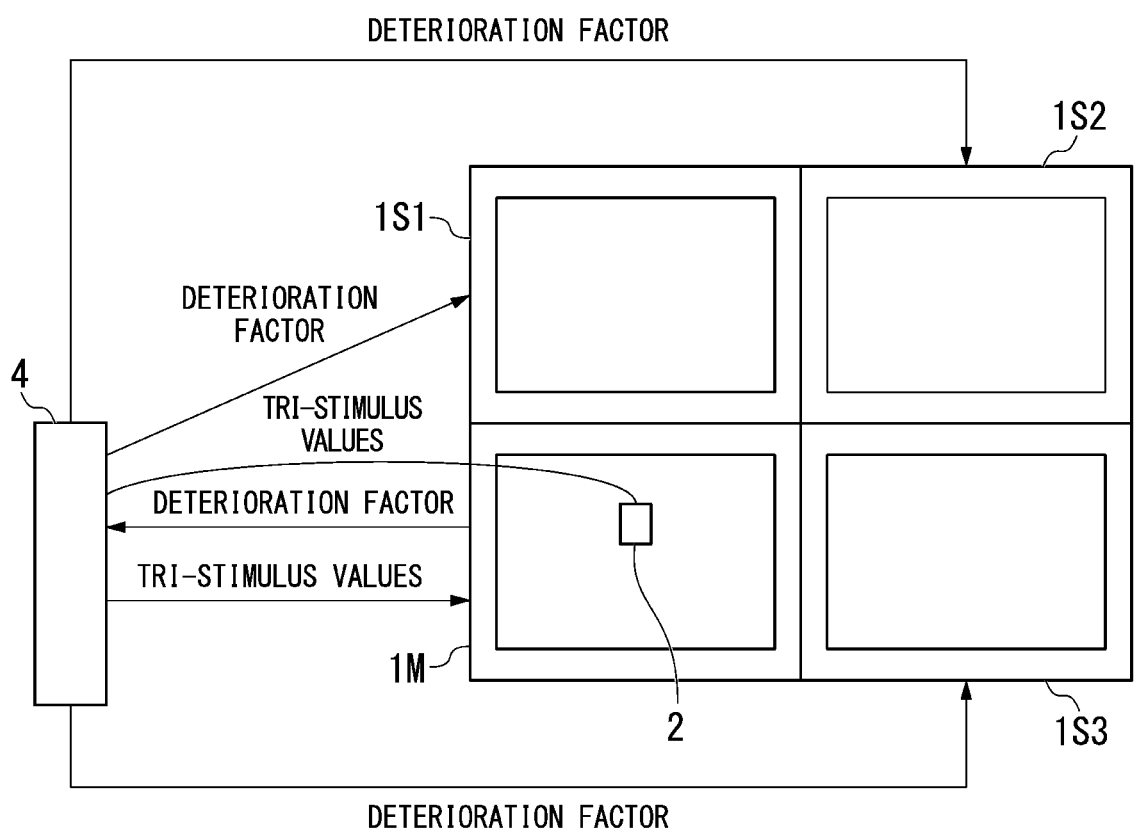
FIG. 4 is a diagram illustrating an example of a flow of data in the multi-display system illustrated in FIGS. 2(B) and 3.

FIG. 4 is a diagram illustrating an example of a flow of data in the multi-display system illustrated in FIGS. 2(B) and 3.

In the example illustrated in FIGS. 3 and 4, data of tri-stimulus values X1, Y1, and Z1 which are an example of the measurement parameters of the image display unit 13 of the master display device 1M is transmitted to the control unit 14 of the master display device 1M via the deterioration factor transmitting receiving unit 4.

The master display device 1M performs adjustment of the master display device 1M on the basis of the tri-stimulus values X1, Y1, and Z1 which are the measurement parameters of the image display unit 13 of the master display device 1M.

The control unit 14 of the master display device 1M calculates the deterioration factors γx, γy, and γz on the basis of the tri-stimulus values X1, Y1, and Z1 which are the measurement parameters of the image display unit 13 and the initial values X0, Y0, and Z0 of the tri-stimulus values which are the measurement parameters of the image display unit 13 stored in the storage unit 15.

In the example illustrated in FIGS. 3 and 4, the deterioration factors γx, γy, and γz calculated by the control unit 14 of the master display device 1M are transmitted to the slave display device 1S1 via the deterioration factor transmitting receiving unit 4. A control unit (not illustrated) of the slave display device 1S1 calculates tri-stimulus values X1a (=γx× X0a), Y1a (=γy×Y0a), and Z1a (=γz×Z0a) which are the measurement parameters of the image display unit of the slave display device 1S1 on the basis of the deterioration factors γx, γy, and γz and the initial values X0a, Y0a, and Z0a of the tri-stimulus values which are the measurement parameters of an image display unit (not illustrated) of the slave display device 1S1 stored in a storage unit (not illustrated) of the slave display device 1S1.

The slave display device 1S1 performs adjustment of the slave display device 1S1 on the basis of the tri-stimulus values X1a, Y1a, and Z1a which are the measurement parameters of the image display unit of the slave display device 1S1.

That is, the slave display device 1S1 can perform adjustment of the slave display device 1S1 without actually measuring luminance and color which are displayed by the image display unit of the slave display device 1S1.

In the example illustrated in FIGS. 3 and 4, the deterioration factors γx, γy, and γz calculated by the control unit 14 of the master display device 1M are transmitted to the slave display device 1S2 via the deterioration factor transmitting receiving unit 4. A control unit (not illustrated) of the slave display device 1S2 calculates tri-stimulus values X1b (=γx× X0b), Y1b (=γy×Y0b), and Z1b (=γz×Z0b) which are the measurement parameters of the image display unit of the slave display device 1S2 on the basis of the deterioration factors γx, γy, and γz and the initial values X0b, Y0b, and Z0b of the tri-stimulus values which are the measurement parameters of an image display unit (not illustrated) of the slave display device 1S2 stored in a storage unit (not illustrated) of the slave display device 1S2.

The slave display device 1S2 performs adjustment of the slave display device 1S2 on the basis of the tri-stimulus values X1$b$, Y1$b$, and Z1$b$ which are the measurement parameters of the image display unit of the slave display device 1S2.

That is, the slave display device 1S2 can perform adjustment of the slave display device 1S2 without actually measuring luminance and color which are displayed by the image display unit of the slave display device 1S2.

In the example illustrated in FIGS. 3 and 4, the deterioration factors γx, γy, and γz calculated by the control unit 14 of the master display device 1M are transmitted to the slave display device 1S3 via the deterioration factor transmitting receiving unit 4. A control unit (not illustrated) of the slave display device 1S3 calculates tri-stimulus values X1$c$ (=γx× X0$c$), Y1$c$ (=γy×Y0$c$), and Z1$c$ (=γz×Z0$c$) which are the measurement parameters of the image display unit of the slave display device 1S3 on the basis of the deterioration factors γx, γy, and γz and the initial values X0$c$, Y0$c$, and Z0$c$ of the tri-stimulus values which are the measurement parameters of an image display unit (not illustrated) of the slave display device 1S3 stored in a storage unit (not illustrated) of the slave display device 1S3.

The slave display device 1S3 performs adjustment of the slave display device 1S3 on the basis of the tri-stimulus values X1$c$, Y1$c$, and Z1$c$ which are the measurement parameters of the image display unit of the slave display device 1S2.

That is, the slave display device 1S3 can perform adjustment of the slave display device 1S3 without actually measuring luminance and color which are displayed by the image display unit of the slave display device 1S3.

Figure 5:
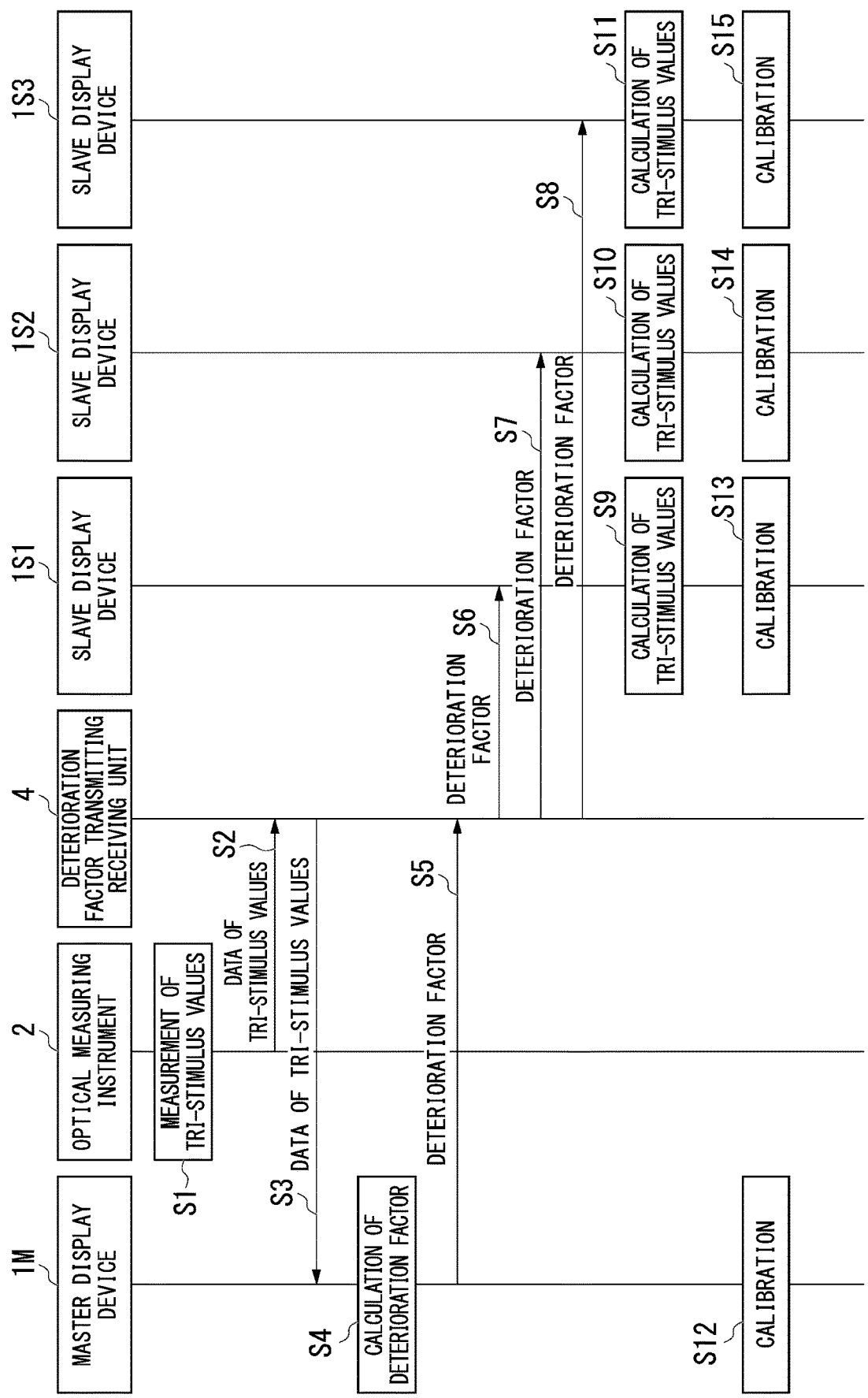
FIG. 5 is a sequence diagram illustrating an example of a flow of processes in the multi-display system illustrated in FIGS. 2(B) and 3.

FIG. 5 is a sequence diagram illustrating an example of a flow of processes in the multi-display system illustrated in FIGS. 2(B) and 3.

In the example illustrated in FIG. 5, in Step S1, the optical measuring instrument 2 measures luminance and color which are displayed by the image display unit 13 of the master display device 1M.

Subsequently, in Step S2, the optical measuring instrument 2 transmits data of tri-stimulus values X1, Y1, and Z1 of the image display unit 13 of the master display device 1M which are parameters that represent the measured luminance and the measured color to the deterioration factor transmitting receiving unit 4.

Subsequently, in Step S3, the deterioration factor transmitting receiving unit 4 transmits data of the tri-stimulus values X1, Y1, and Z1 which are the measurement parameters of the image display unit 13 of the master display device 1M to the control unit 14 of the master display device 1M.

Subsequently, in Step S4, the deterioration factor calculating unit 3 of the control unit 14 of the master display device 1M calculates deterioration factors γx, γy, and γz on the basis of the tri-stimulus values X1, Y1, and Z1 which are the measurement parameters of the image display unit 13 of the master display device 1M and the initial values X0, Y0, and Z0 of the tri-stimulus values which are the measurement parameters of the image display unit 13 of the master display device 1M stored in the storage unit 15.

Subsequently, in Step S5, the control unit 14 of the master display device 1M transmits the deterioration factors γx, γy, and γz to the deterioration factor transmitting receiving unit 4.

Subsequently, in Step S6, the deterioration factor transmitting receiving unit 4 transmits the deterioration factors γx, γy, and γz to the slave display device 1S1.

Subsequently, in Step S7, the deterioration factor transmitting receiving unit 4 transmits the deterioration factors γx, γy, and γz to the slave display device 1S2.

Subsequently, in Step S8, the deterioration factor transmitting receiving unit 4 transmits the deterioration factors γx, γy, and γz to the slave display device 1S3.

Subsequently, in Step S9, the control unit of the slave display device 1S1 calculates the tri-stimulus values X1$a$, Y1$a$, and Z1$a$ which are the measurement parameters of the image display unit of the slave display device 1S1 on the basis of the deterioration factors γx, γy, and γz and the initial values X0$a$, Y0$a$, and Z0$a$ of the tri-stimulus values which are the measurement parameters of the image display unit of the slave display device 1S1 stored in the storage unit of the slave display device 1S1.

In Step S10, the control unit of the slave display device 1S2 calculates the tri-stimulus values X1$b$, Y1$b$, and Z1$b$ which are the measurement parameters of the image display unit of the slave display device 1S2 on the basis of the deterioration factors γx, γy, and γz and the initial values X0$b$, Y0$b$, and Z0$b$ of the tri-stimulus values which are the measurement parameters of the image display unit of the slave display device 1S2 stored in the storage unit of the slave display device 1S2.

In Step S11, the control unit of the slave display device 1S3 calculates the tri-stimulus values X1$c$, Y1$c$, and Z1$c$ which are the measurement parameters of the image display unit of the slave display device 1S3 on the basis of the deterioration factors γx, γy, and γz and the initial values X0$c$, Y0$c$, and Z0$c$ of the tri-stimulus values which are the measurement parameters of the image display unit of the slave display device 1S3 stored in the storage unit of the slave display device 1S3.

Subsequently, in Step S12, the master display device 1M performs adjustment (calibration) of the master display device 1M on the basis of the tri-stimulus values X1, Y1, and Z1 which are the measurement parameters of the image display unit 13 of the master display device 1M.

In Step S13, the slave display device 1S1 performs adjustment (calibration) of the slave display device 1S1 on the basis of the tri-stimulus values X1$a$, Y1$a$, and Z1$a$ which are the measurement parameters of the image display unit of the slave display device 1S1 calculated in Step S9.

In Step S14, the slave display device 1S2 performs adjustment (calibration) of the slave display device 1S2 on the basis of the tri-stimulus values X1$b$, Y1$b$, and Z1$b$ which are the measurement parameters of the image display unit of the slave display device 1S2 calculated in Step S10.

In Step S15, the slave display device 1S3 performs adjustment (calibration) of the slave display device 1S3 on the basis of the tri-stimulus values X1$c$, Y1$c$, and Z1$c$ which are the measurement parameters of the image display unit of the slave display device 1S3 calculated in Step S11.

In the example illustrated in FIGS. 2(B), 3, and 5, in a period after adjustment of the master display device 1M has been performed in Step S12 and before adjustment of the master display device 1M is performed again in next Step S12 (that is, between adjustment times of the master display device 1M), the prediction and adjustment unit 14B of the control unit 14 of the master display device 1M predicts and adjusts a luminance and/or color shift of the image display unit 13.

Specifically, the prediction and adjustment unit 14B of the control unit 14 of the master display device 1M predicts and adjusts the luminance and/or color shift of the image display unit 13 on the basis of the deterioration factors γx, γy, and γz which are interpolated on the basis of the usage time of the backlight 16 calculated by the backlight usage time calculating unit 14A.

In the example illustrated in FIGS. 2(B), 3, and 5, in a period after adjustment of the slave display device 1S1 has been performed in Step S13 and before adjustment of the slave display device 1S1 is performed again in next Step S13 (that is, between adjustment times of the slave display device 1S1), the prediction and adjustment unit of the control unit of the slave display device 1S1 predicts and adjusts a luminance and/or color shift of the image display unit of the slave display device 1S1.

Specifically, the prediction and adjustment unit of the control unit of the slave display device 1S1 predicts and adjusts the luminance and/or color shift of the image display unit of the slave display device 1S1 on the basis of the deterioration factors γx, γy, and γz which are interpolated on the basis of the usage time of the backlight 16 calculated by the backlight usage time calculating unit 14A of the control unit 14 of the master display device 1M.

In the example illustrated in FIGS. 2(B), 3, and 5, in a period after adjustment of the slave display device 1S2 has been performed in Step S14 and before adjustment of the slave display device 1S2 is performed again in next Step S14 (that is, between adjustment times of the slave display device 1S2), the prediction and adjustment unit of the control unit of the slave display device 1S2 predicts and adjusts a luminance and/or color shift of the image display unit of the slave display device 1S2.

Specifically, the prediction and adjustment unit of the control unit of the slave display device 1S2 predicts and adjusts the luminance and/or color shift of the image display unit of the slave display device 1S2 on the basis of the deterioration factors γx, γy, and γz which are interpolated on the basis of the usage time of the backlight 16 calculated by the backlight usage time calculating unit 14A of the control unit 14 of the master display device 1M.

In the example illustrated in FIGS. 2(B), 3, and 5, in a period after adjustment of the slave display device 1S3 has been performed in Step S15 and before adjustment of the slave display device 1S3 is performed again in next Step S15 (that is, between adjustment times of the slave display device 1S3), the prediction and adjustment unit of the control unit of the slave display device 1S3 predicts and adjusts a luminance and/or color shift of the image display unit of the slave display device 1S3.

Specifically, the prediction and adjustment unit of the control unit of the slave display device 1S3 predicts and adjusts the luminance and/or color shift of the image display unit of the slave display device 1S3 on the basis of the deterioration factors γx, γy, and γz which are interpolated on the basis of the usage time of the backlight 16 calculated by the backlight usage time calculating unit 14A of the control unit 14 of the master display device 1M.

For example, in the master display device 1M of the multi-display system according to the first embodiment, the control unit 14 generates a first control signal for controlling the image processing unit 12 on the basis of adjustment parameters stored in the storage unit 15 at the time of shipment (in an initial state). The image processing unit 12 processes an input image signal which is input from the image signal input unit 11 on the basis of the first control signal. The image display unit 13 displays an image which is processed by the image processing unit 12. As a result, the image display unit 13 can perform consistent display of color.

However, for example, in a state in which a predetermined time has elapsed from the time of shipment such as after one year has elapsed after the time of shipment, aging deterioration of the image display unit 13 occurs. When display based on the adjustment parameters in the initial state is performed, a color shift and a luminance shift occur and thus it is not possible to display consistent color.

Therefore, the master display device 1M and the slave display devices 1S1, 1S2, and 1S3 of the multi-display system according to the first embodiment performs adjustment (calibration) in Steps S12, S13, S14, and S15 of FIG. 5.

Specifically, in the multi-display system according to the first embodiment, the optical measuring instrument 2 acquires deterioration degree information (deterioration factors γx, γy, and γz) of the master display device 1M on the basis of the tri-stimulus values X1, Y1, and Z1 constituting the measured luminance and the measured color by measuring the luminance and the color displayed by the image display unit 13 of the master display device 1M. The deterioration degree information (deterioration factors γx, γy, and γz) of the master display device 1M is shared by the slave display devices 1S1, 1S2, and 1S3. That is, the deterioration degree information (deterioration factors γx, γy, and γz) of the master display device 1M is applied to the slave display devices 1S1, 1S2, and 1S3. As a result, it is possible to simply adjust the slave display devices 1S1, 1S2, and 1S3 without actually measuring luminance and color displayed by the image display units of the slave display devices 1S1, 1S2, and 1S3.

For example, a backlight such as the backlight 16 of the master display device 1M deteriorates due to aging deterioration. Examples of the backlight include a cold cathode fluorescent lamp (CCFL) backlight and a light emitting diode (LED) backlight. In recent LED backlights, the time required for luminance thereof to fall to a half is 30000 hours. The same type of backlights are likely to have similar characteristics.

In order to acquire a degree of deterioration of a white LED backlight, it is necessary to acquire tri-stimulus values which are measurement parameters. This is because chromaticity in addition to luminance also changes due to deterioration.

Therefore, in the multi-display system according to the first embodiment, when the master display device 1M is displaying white (W(255, 255, 255)), the optical measuring instrument 2 measures luminance and color displayed by the image display unit 13 of the master display device 1M and acquires tri-stimulus values X1, Y1, and Z1 constituting the luminance and the color.

In the multi-display system according to the first embodiment, since the deterioration factors γx (=X1/X0), γy (=Y1/Y0), and γz (=Z1/Z0) are calculated in Step S4 of FIG. 5, it is possible to ascertain a degree of deterioration of the backlight 16 of the master display device 1M. Accordingly, in the multi-display system according to the first embodiment, even when the backlight 16 of the master display device 1M has deteriorated, it is possible to display correct luminance and correct color by correcting the luminance through backlight control and correcting the color through white balance control using the deterioration factors γx, γy, and γz (that is, compensating for the deterioration). Specifically, adjustment of brightness of the backlight 16 is performed by changing an amount of current supplied to the backlight 16.

Luminance and chromaticity may shift depending on an amount of current supplied to the backlight 16.

In this case, in the multi-display system according to the first embodiment, the optical measuring instrument 2 measures luminance and color at a plurality of points such as three points and acquires tri-stimulus values X1, Y1, and Z1 which are measurement parameters that represent the luminance and the color. The deterioration factor calculating unit 3 calculates the deterioration factors γx, γy, and γz at each of the plurality of points and interpolates the deterioration factors γx, γy, and γz therebetween. In the multi-display system according to the first embodiment, it is also possible to compensate for brightness which is different from that at the time of measurement.

In white balance control, white is displayed (expressed) by displaying a red pixel, a green pixel, and a blue pixel. By what degree color shifts by what values the red pixel, the green pixel, and the blue pixel are to change is measured in advance, for example, in a factory.

Accordingly, in the multi-display system according to the first embodiment, it is possible to perform color correction using the deterioration factors γx, γy, and γz.

When color correction is performed, luminance may decrease.

Therefore, in the multi-display system according to the first embodiment, brightness of the backlight 16 changes by the change of luminance. Accordingly, it is possible to realize desired luminance.

In the example illustrated in FIG. 2(A) or the example illustrated in FIG. 2(B) (the example illustrated in FIG. 4), the deterioration factors γx, γy, and γz are transmitted and received by the deterioration factor transmitting receiving unit 4. In another example, the master display device 1M and the slave display devices 1S1, 1S2, and 1S3 may transmit and receive the deterioration factors γx, γy, and γz therebetween.

In the example illustrated in FIG. 2(A) or the example illustrated in FIG. 2(B) (the example illustrated in FIG. 4), data of the tri-stimulus values X1, Y1, and Z1 which are the measurement parameters of the image display unit 13 of the master display device 1M acquired by the optical measuring instrument 2 is transmitted to the master display device 1M via the deterioration factor transmitting receiving unit 4. In another example, data of the tri-stimulus values X1, Y1, and Z1 which are the measurement parameters may be transmitted and received between the optical measuring instrument 2 and the master display device 1M.

In an example of the multi-display system according to the first embodiment, the master display device 1M and the slave display devices 1S1, 1S2, and 1S3 include a spontaneous light emitting device such as an organic electroluminescence (EL) device.

In another example of the multi-display system according to the first embodiment, the master display device 1M and the slave display devices 1S1, 1S2, and 1S3 may include a non-spontaneous light emitting device such as a liquid crystal panel.

When the master display device 1M and the slave display devices 1S1, 1S2, and 1S3 include a non-spontaneous light emitting device such as a liquid crystal panel, the multi-display system is more effective than when the master display device 1M and the slave display devices 1S1, 1S2, and 1S3 include a spontaneous light emitting device such as an organic EL device. In case of spontaneous light emitting, a degree of deterioration changes depending on a pattern which is displayed.

In the multi-display system according to the first embodiment, as described above, the deterioration factors γx, γy, and γz are calculated, for example, depending on a user's usage environment and adjustment is performed. Accordingly, other display devices which are used in the same usage environment can be more accurately adjusted. The reason why more accurate adjustment is possible in the same usage environment is that a degree of deterioration is changed due to set parameters such as a use temperature or brightness at the time of use.

The deterioration factors γx, γy, and γz change with the elapse of the usage time of the backlight 16.

Therefore, in the multi-display system according to the first embodiment, the storage unit 15 of the master display device 1M stores the usage time of the backlight 16 calculated by the backlight usage time calculating unit 14A in addition to the deterioration factors γx, γy, and γz calculated by the deterioration factor calculating unit 3. Specifically, the storage unit 15 stores a plurality of times of use of the backlight 16 calculated by the backlight usage time calculating unit 14A.

Accordingly, in the multi-display system according to the first embodiment, the deterioration factor calculating unit 3 can calculate the deterioration factors γx, γy, and γz from the usage time of the backlight 16 by interpolation. By calculating the deterioration factors γx, γy, and γz from the current usage time of the backlight 16 by interpolation, it is possible to predict and adjust a luminance and/or color shift without performing adjustment.

In the example illustrated in FIG. 5, the deterioration factors γx, γy, and γz are transmitted and received between the master display device 1M and the slave display devices 1S1, 1S2, and 1S3. In another example, the deterioration factors γx, γy, and γz and the usage time of the backlight 16 may be transmitted and received between the master display device 1M and the slave display devices 1S1, 1S2, and 1S3.

In other words, with the multi-display system according to the first embodiment, it is not necessary to individually measure and adjust luminance and color in each of a plurality of display devices and it is possible to shorten a time required for adjustment. Even when a display device is installed at a position beyond an operator's reach (beyond an adjustment performer's reach), it is possible to easily perform adjustment.

For example, when a plurality of display devices are simultaneously used such as a tiled matrix, it is possible to simply simultaneously adjust the plurality of display devices by measuring luminance and color in one display device within an operator's reach, calculating the deterioration factors γx, γy, and γz, and applying the calculated deterioration factors γx, γy, and γz to other display devices.

A second embodiment of the multi-display system and the method of adjusting a multi-display system according to the invention will be described below with reference to the accompanying drawings.

The multi-display system according to the second embodiment has the same configuration as the multi-display system according to the first embodiment except for the following points. Accordingly, with the multi-display system according to the second embodiment, it is possible to achieve the same advantages as in the multi-display system according to the first embodiment except for the following points.

Figure 6:
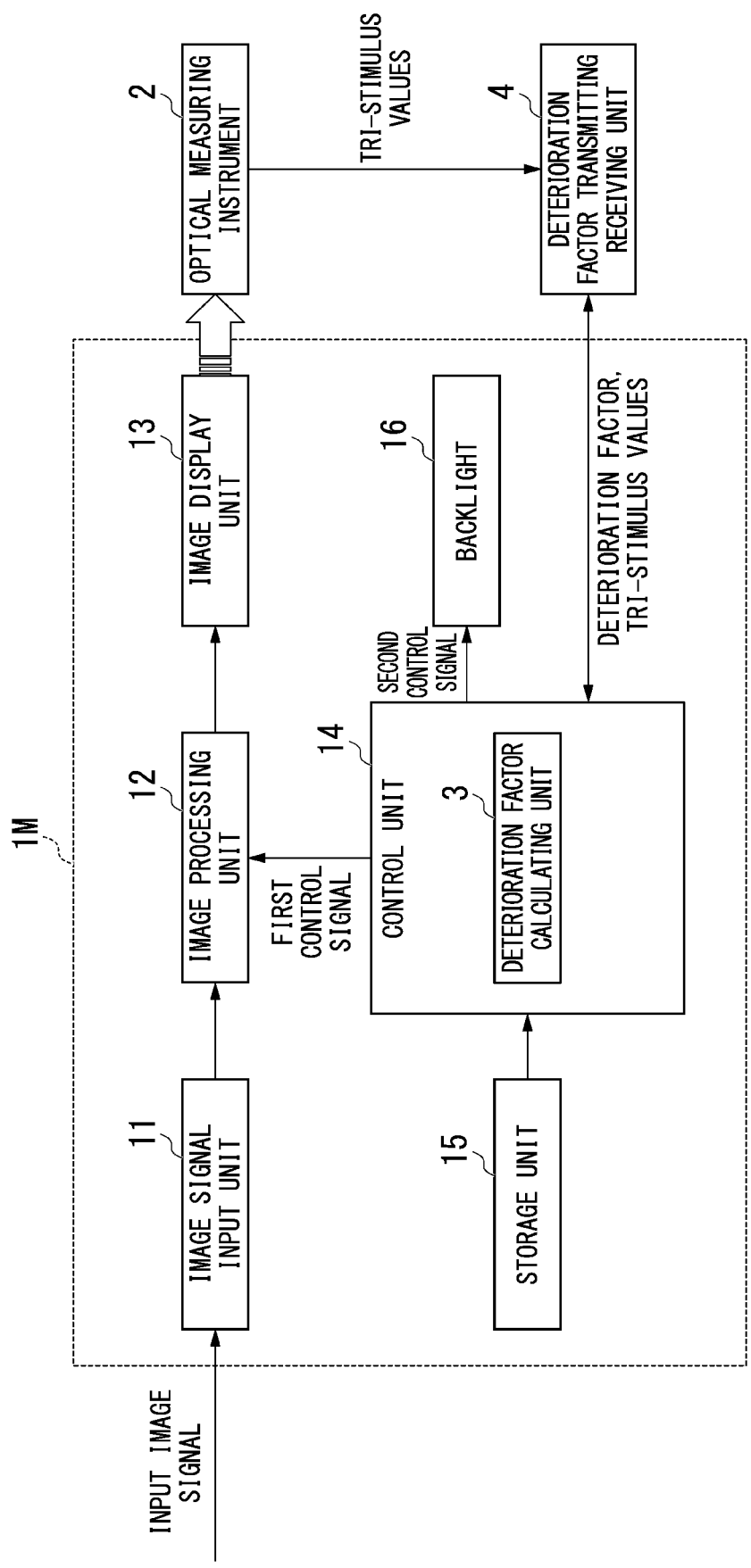
FIG. 6 is a diagram illustrating an example of a relationship between a master display device, an optical measuring instrument, and a deterioration factor transmitting receiving unit in a multi-display system according to a second embodiment.

FIG. 6 is a diagram illustrating an example of a relationship between a master display device 1M, an optical measuring instrument 2, and a deterioration factor transmitting receiving unit 4 in the multi-display system according to the second embodiment.

As described above, in the example illustrated in FIG. 3, the control unit 14 includes a deterioration factor calculating unit 3, a backlight usage time calculating unit 14A, and a prediction and adjustment unit 14B.

On the other hand, in the example illustrated in FIG. 6, the control unit 14 does not include the backlight usage time calculating unit 14A and the prediction and adjustment unit 14B and includes only the deterioration factor calculating unit 3.

A third embodiment of the multi-display system and the method of adjusting a multi-display system according to the invention will be described below with reference to the accompanying drawings.

The multi-display system according to the third embodiment has the same configuration as the multi-display system according to the first embodiment except for the following points. Accordingly, with the multi-display system according to the third embodiment, it is possible to achieve the same advantages as in the multi-display system according to the first embodiment except for the following points.

Figure 7:
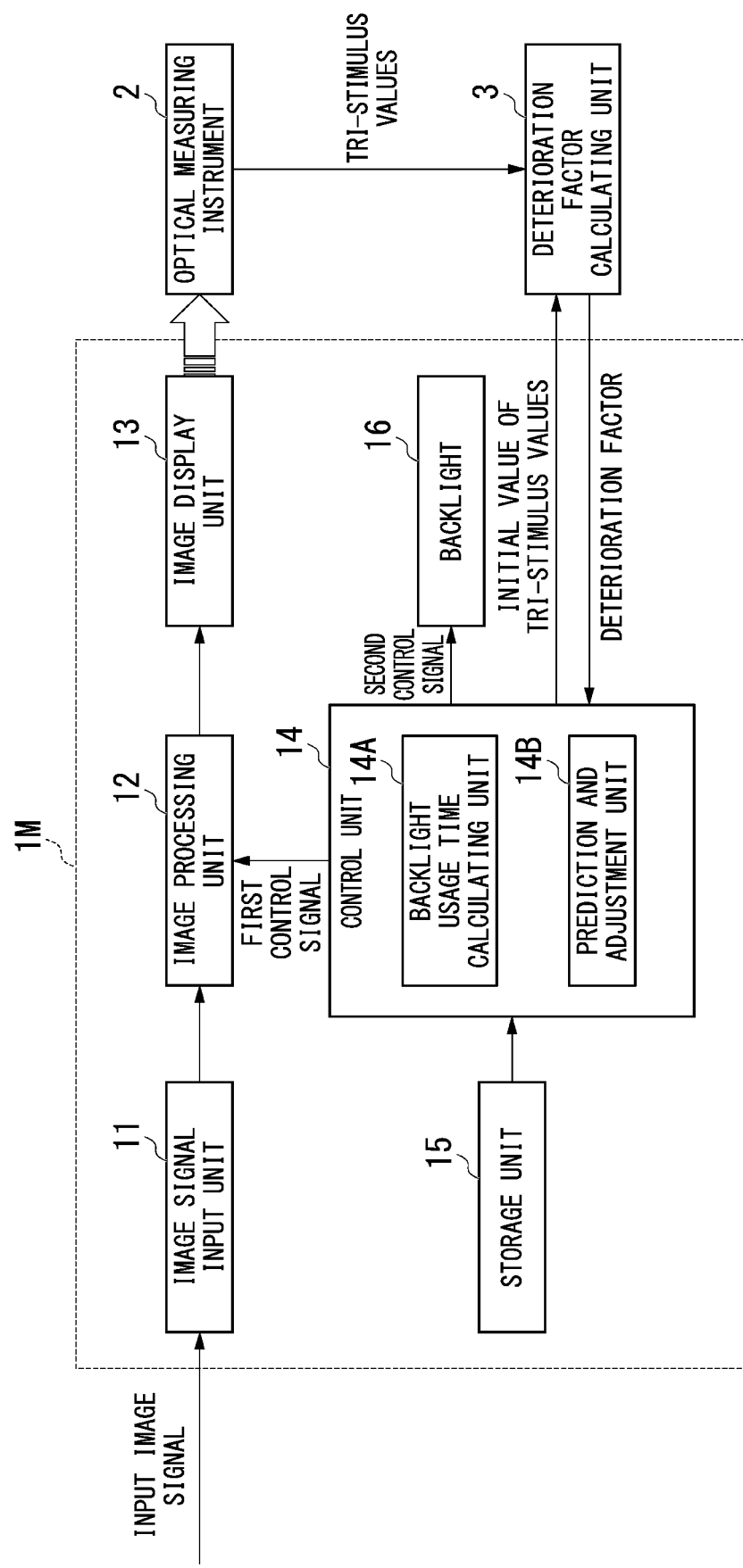
FIG. 7 is a diagram illustrating an example of a relationship between a master display device, an optical measuring instrument, and a deterioration factor calculating unit in a multi-display system according to a third embodiment.

FIG. 7 is a diagram illustrating an example of a relationship between a master display device 1M, an optical measuring instrument 2, and a deterioration factor calculating unit 3 in the multi-display system according to the third embodiment.

As illustrated in FIG. 3, the multi-display system according to the first embodiment includes the deterioration factor transmitting receiving unit 4. As illustrated in FIG. 7, the multi-display system according to the third embodiment does not include the deterioration factor transmitting receiving unit 4.

In the example illustrated in FIG. 3, the deterioration factor calculating unit 3 is provided in the control unit 14 of the master display device 1M. In the example illustrated in FIG. 7, the deterioration factor calculating unit 3 is provided separately from the master display device 1M.

In the example illustrated in FIG. 7, the deterioration factor calculating unit 3 receives, for example, tri-stimulus values X1, Y1, and Z1 which are the measurement parameters of the image display unit 13 of the master display device 1M from the optical measuring instrument 2 and transmits the deterioration factors γx, γy, and γz to the control unit 14 of the master display device 1M. The deterioration factor calculating unit 3 receives initial values X0, Y0, and Z0 of the tri-stimulus values which are the measurement parameters from the control unit 14. The control unit 14 includes a backlight usage time calculating unit 14A and a prediction and adjustment unit 14B.

In the example illustrated in FIG. 7, the backlight usage time calculating unit 14A calculates a usage time of the backlight 16 (specifically, a cumulative usage time). The control unit 14 transmits data of the usage time of the backlight 16 calculated by the backlight usage time calculating unit 14A to the deterioration factor calculating unit 3.

The deterioration factor calculating unit 3 interpolates the deterioration factors γx, γy, and γz, which are calculated on the basis of the tri-stimulus values X1, Y1, and Z1 which are the measurement parameters of the image display unit 13 and the initial values X0, Y0, and Z0 of the tri-stimulus values which are the measurement parameters of the image display unit 13, on the basis of the usage time of the backlight 16 calculated by the backlight usage time calculating unit 14A.

Figure 8:
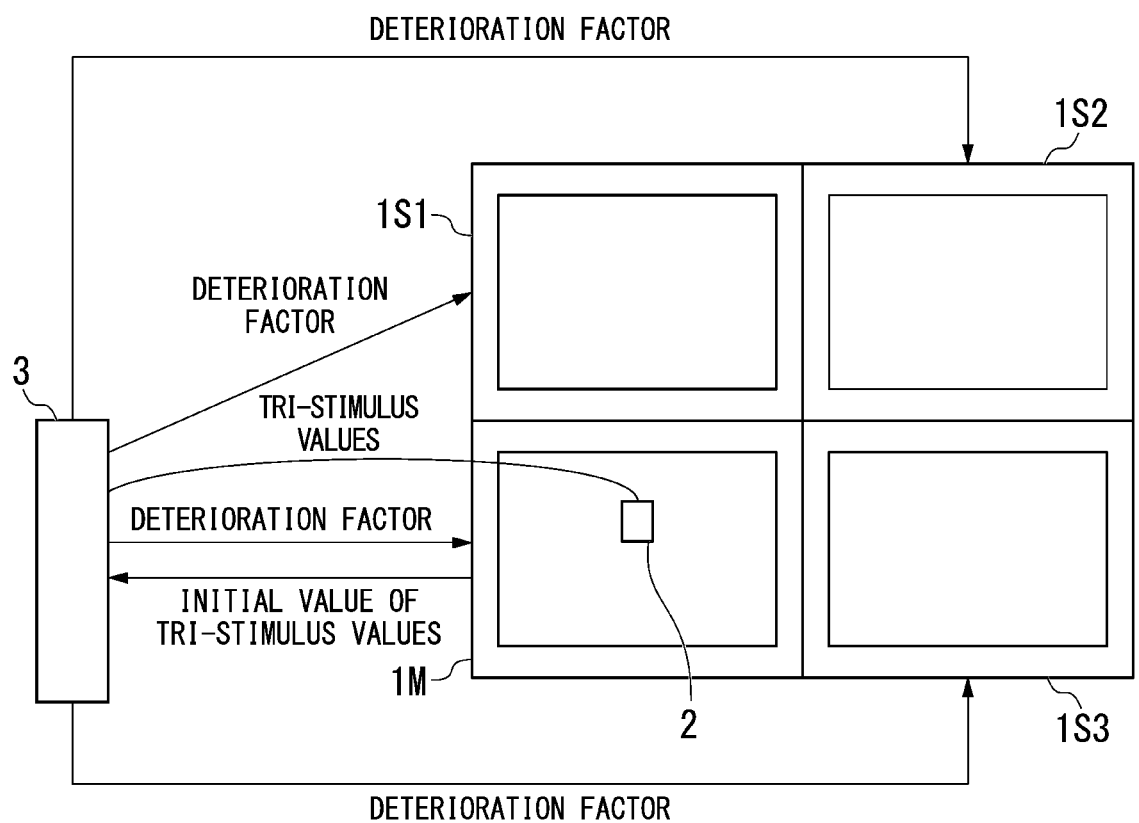
FIG. 8 is a diagram illustrating an example of a flow of data in the multi-display system according to the third embodiment.

FIG. 8 is a diagram illustrating an example of a flow of data in the multi-display system according to the third embodiment.

In the example illustrated in FIGS. 7 and 8, for example, data of the tri-stimulus values X1, Y1, and Z1 which are the measurement parameters of the image display unit 13 of the master display device 1M is transmitted to the deterioration factor calculating unit 3.

The deterioration factor calculating unit 3 receives the initial values X0, Y0, and Z0 of tri-stimulus values which are the measurement parameters of the image display unit 13 from the control unit 14. The deterioration factor calculating unit 3 calculates the deterioration factors γx, γy, and γz on the basis of the tri-stimulus values X1, Y1, and Z1 which are the measurement parameters of the image display unit 13 and the initial values X0, Y0, and Z0 of the tri-stimulus values which are the measurement parameters of the image display unit 13. The deterioration factor calculating unit 3 transmits the deterioration factors γx, γy, and γz to the control unit 14 of the master display device 1M.

The master display device 1M performs adjustment of the master display device 1M on the basis of the tri-stimulus values X1, Y1, and Z1 which are the measurement parameters of the image display unit 13 of the master display device 1M.

In the example illustrated in FIG. 8, the deterioration factors γx, γy, and γz calculated by the deterioration factor calculating unit 3 are transmitted to the slave display device 1S1. The control unit (not illustrated) of the slave display device 1S1 calculates tri-stimulus values $X1a\ (=\gamma x \times X0a)$, $Y1a\ (=\gamma y \times Y0a)$, and $Z1a\ (=\gamma z \times Z0a)$ which are the measurement parameters of the image display unit of the slave display device 1S1 on the basis of the deterioration factors γx, γy, and γz and the initial values X0a, Y0a, and Z0a of the tri-stimulus values which are the measurement parameters of the image display unit (not illustrated) of the slave display device 1S1 stored in the storage unit (not illustrated) of the slave display device 1S1.

The slave display device 1S1 performs adjustment of the slave display device 1S1 on the basis of the tri-stimulus values X1a, Y1a, and Z1a which are the measurement parameters of the image display unit of the slave display device 1S1.

In the example illustrated in FIG. 8, the deterioration factors γx, γy, and γz calculated by the deterioration factor calculating unit 3 are transmitted to the slave display device 1S2. The control unit (not illustrated) of the slave display device 1S2 calculates tri-stimulus values $X1b\ (=\gamma x \times X0b)$, $Y1b\ (=\gamma y \times Y0b)$, and $Z1b\ (=\gamma z \times Z0b)$ which are the measurement parameters of the image display unit of the slave display device 1S2 on the basis of the deterioration factors γx, γy, and γz and the initial values X0b, Y0b, and Z0b of the tri-stimulus values which are the measurement parameters of the image display unit (not illustrated) of the slave display device 1S2 stored in the storage unit (not illustrated) of the slave display device 1S2.

The slave display device 1S2 performs adjustment of the slave display device 1S2 on the basis of the tri-stimulus values X1b, Y1b, and Z1b which are the measurement parameters of the image display unit of the slave display device 1S2.

In the example illustrated in FIG. 8, the deterioration factors γx, γy, and γz calculated by the deterioration factor calculating unit 3 are transmitted to the slave display device 1S3. The control unit (not illustrated) of the slave display device 1S3 calculates tri-stimulus values $X1c\ (=\gamma x \times X0c)$, $Y1c\ (=\gamma y \times Y0c)$, and $Z1c\ (=\gamma z \times Z0c)$ which are the measurement parameters of the image display unit of the slave display device 1S3 on the basis of the deterioration factors γx, γy, and γz and the initial values X0c, Y0c, and Z0c of the tri-stimulus values which are the measurement parameters of the image display unit (not illustrated) of the slave display device 1S3 stored in the storage unit (not illustrated) of the slave display device 1S3.

The slave display device 1S3 performs adjustment of the slave display device 1S3 on the basis of the tri-stimulus values X1c, Y1c, and Z1c which are the measurement parameters of the image display unit of the slave display device 1S2.

Figure 9:
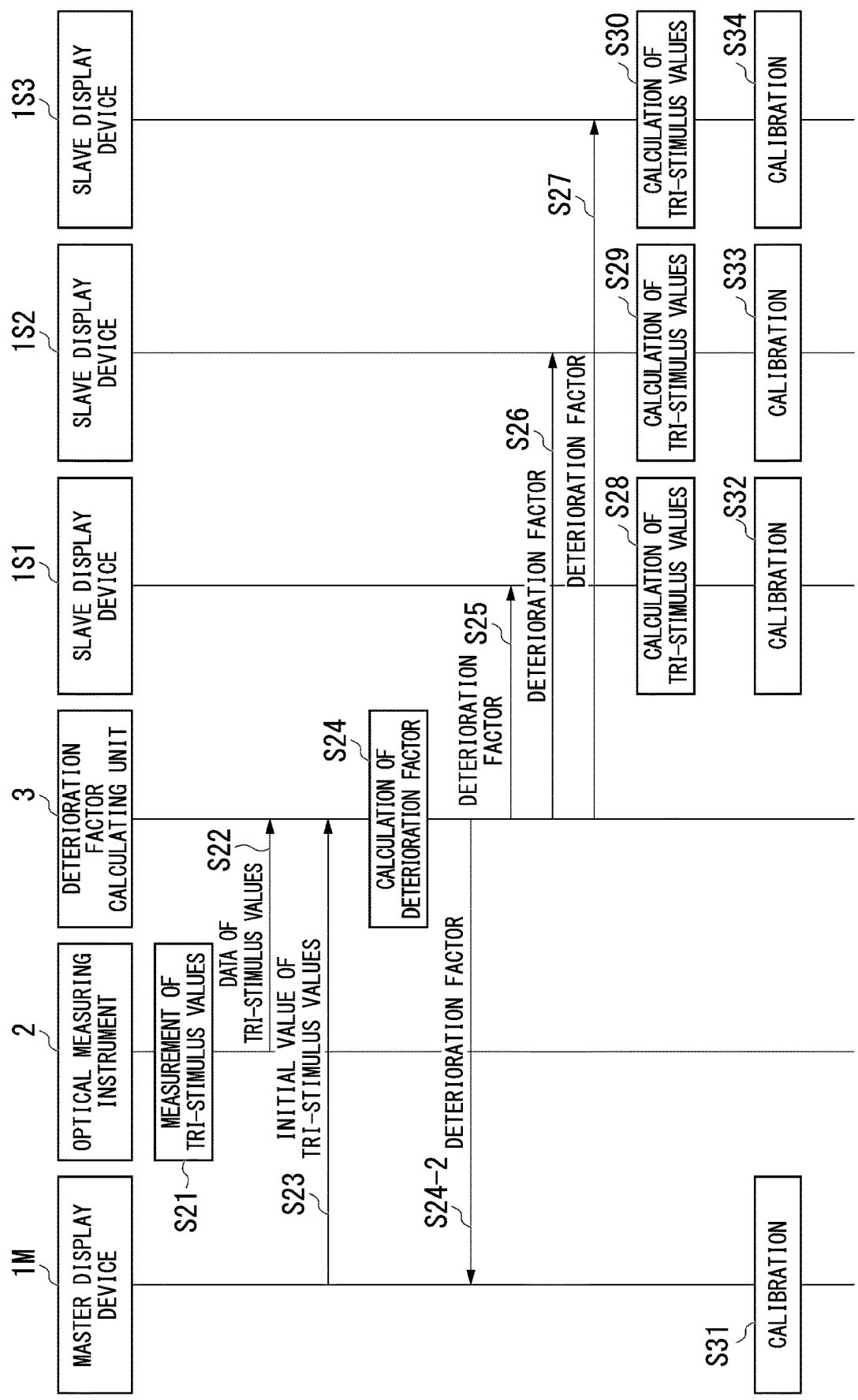
FIG. 9 is a sequence diagram illustrating an example of a flow of processes in the multi-display system according to the third embodiment.

FIG. 9 is a sequence diagram illustrating an example of a flow of processes in the multi-display system according to the third embodiment.

In the example illustrated in FIG. 9, in Step S21, the optical measuring instrument 2 measures luminance and color which are displayed by the image display unit 13 of the master display device 1M.

Subsequently, in Step S22, the optical measuring instrument 2 transmits data of the tri-stimulus values X1, Y1, and Z1 of the image display unit 13 of the master display device 1M which are parameters that represent the measured luminance and the measured color to the deterioration factor calculating unit 3.

Subsequently, in Step S23, the control unit 14 of the master display device 1M transmits the initial values X0, Y0, and Z0 of the tri-stimulus values which are the measurement parameters of the image display unit 13 of the master display device 1M to the deterioration factor calculating unit 3.

Subsequently, in Step S24, the deterioration factor calculating unit 3 calculates the deterioration factors γx, γy, and γz on the basis of the tri-stimulus values X1, Y1, and Z1 which are the measurement parameters of the image display unit 13 of the master display device 1M and the initial values X0, Y0, and Z0 of the tri-stimulus values which are the measurement parameters of the image display unit 13 of the master display device 1M.

Subsequently, in Step S24-2, the deterioration factor calculating unit 3 transmits the deterioration factors γx, γy, and γz to the control unit 14 of the master display device 1M.

Subsequently, in Step S25, the deterioration factor calculating unit 3 transmits the deterioration factors γx, γy, and γz to the slave display device 1S1.

Subsequently, in Step S26, the deterioration factor calculating unit 3 transmits the deterioration factors γx, γy, and γz to the slave display device 1S2.

Subsequently, in Step S27, the deterioration factor calculating unit 3 transmits the deterioration factors γx, γy, and γz to the slave display device 1S3.

Subsequently, in Step S28, the control unit of the slave display device 1S1 calculates the tri-stimulus values X1a, Y1a, and Z1a which are the measurement parameters of the image display unit of the slave display device 1S1 on the basis of the deterioration factors γx, γy, and γz and the initial values X0a, Y0a, and Z0a of the tri-stimulus values which are the measurement parameters of the image display unit of the slave display device 1S1 stored in the storage unit of the slave display device 1S1.

In Step S29, the control unit of the slave display device 1S2 calculates the tri-stimulus values X1b, Y1b, and Z1b which are the measurement parameters of the image display unit of the slave display device 1S2 on the basis of the deterioration factors γx, γy, and γz and the initial values X0b, Y0b, and Z0b of the tri-stimulus values which are the measurement parameters of the image display unit of the slave display device 1S2 stored in the storage unit of the slave display device 1S2.

In Step S30, the control unit of the slave display device 1S3 calculates the tri-stimulus values X1c, Y1c, and Z1c which are the measurement parameters of the image display unit of the slave display device 1S3 on the basis of the deterioration factors γx, γy, and γz and the initial values X0c, Y0c, and Z0c of the tri-stimulus values which are the measurement parameters of the image display unit of the slave display device 1S3 stored in the storage unit of the slave display device 1S3.

Subsequently, in Step S31, the master display device 1M performs adjustment (calibration) of the master display device 1M on the basis of the tri-stimulus values X1, Y1, and Z1 which are the measurement parameters of the image display unit 13 of the master display device 1M.

In Step S32, the slave display device 1S1 performs adjustment (calibration) of the slave display device 1S1 on the basis of the tri-stimulus values X1a, Y1a, and Z1a which are the measurement parameters of the image display unit of the slave display device 1S1 calculated in Step S28.

In Step S33, the slave display device 1S2 performs adjustment (calibration) of the slave display device 1S2 on the basis of the tri-stimulus values X1b, Y1b, and Z1b which are the measurement parameters of the image display unit of the slave display device 1S2 calculated in Step S29.

In Step S34, the slave display device 1S3 performs adjustment (calibration) of the slave display device 1S3 on the basis of the tri-stimulus values X1c, Y1c, and Z1c which are the measurement parameters of the image display unit of the slave display device 1S3 calculated in Step S30.

In the example illustrated in FIGS. 7 to 9, in a period after adjustment of the master display device 1M has been performed in Step S31 and before adjustment of the master display device 1M is performed again in next Step S31 (that is, between adjustment times of the master display device 1M), the prediction and adjustment unit 14B of the control unit 14 of the master display device 1M predicts and adjusts a luminance and/or color shift of the image display unit 13.

In the example illustrated in FIGS. 7 to 9, in a period after adjustment of the slave display device 1S1 has been performed in Step S32 and before adjustment of the slave display device 1S1 is performed again in next Step S32 (that is, between adjustment times of the slave display device 1S1), the prediction and adjustment unit of the control unit of the slave display device 1S1 predicts and adjusts a luminance and/or color shift of the image display unit of the slave display device 1S1.

In the example illustrated in FIGS. 7 to 9, in a period after adjustment of the slave display device 1S2 has been performed in Step S33 and before adjustment of the slave display device 1S2 is performed again in next Step S33 (that is, between adjustment times of the slave display device 1S2), the prediction and adjustment unit of the control unit of the slave display device 1S2 predicts and adjusts a luminance and/or color shift of the image display unit of the slave display device 1S2.

In the example illustrated in FIGS. 7 to 9, in a period after adjustment of the slave display device 1S3 has been performed in Step S34 and before adjustment of the slave display device 1S3 is performed again in next Step S34 (that is, between adjustment times of the slave display device 1S3), the prediction and adjustment unit of the control unit of the slave display device 1S3 predicts and adjusts a luminance and/or color shift of the image display unit of the slave display device 1S3.

A fourth embodiment of the multi-display system and the method of adjusting a multi-display system according to the invention will be described below with reference to the accompanying drawings.

The multi-display system according to the fourth embodiment has the same configuration as the multi-display system according to the third embodiment except for the following points. Accordingly, with the multi-display system according to the fourth embodiment, it is possible to achieve the same advantages as in the multi-display system according to the third embodiment except for the following points.

Figure 10:
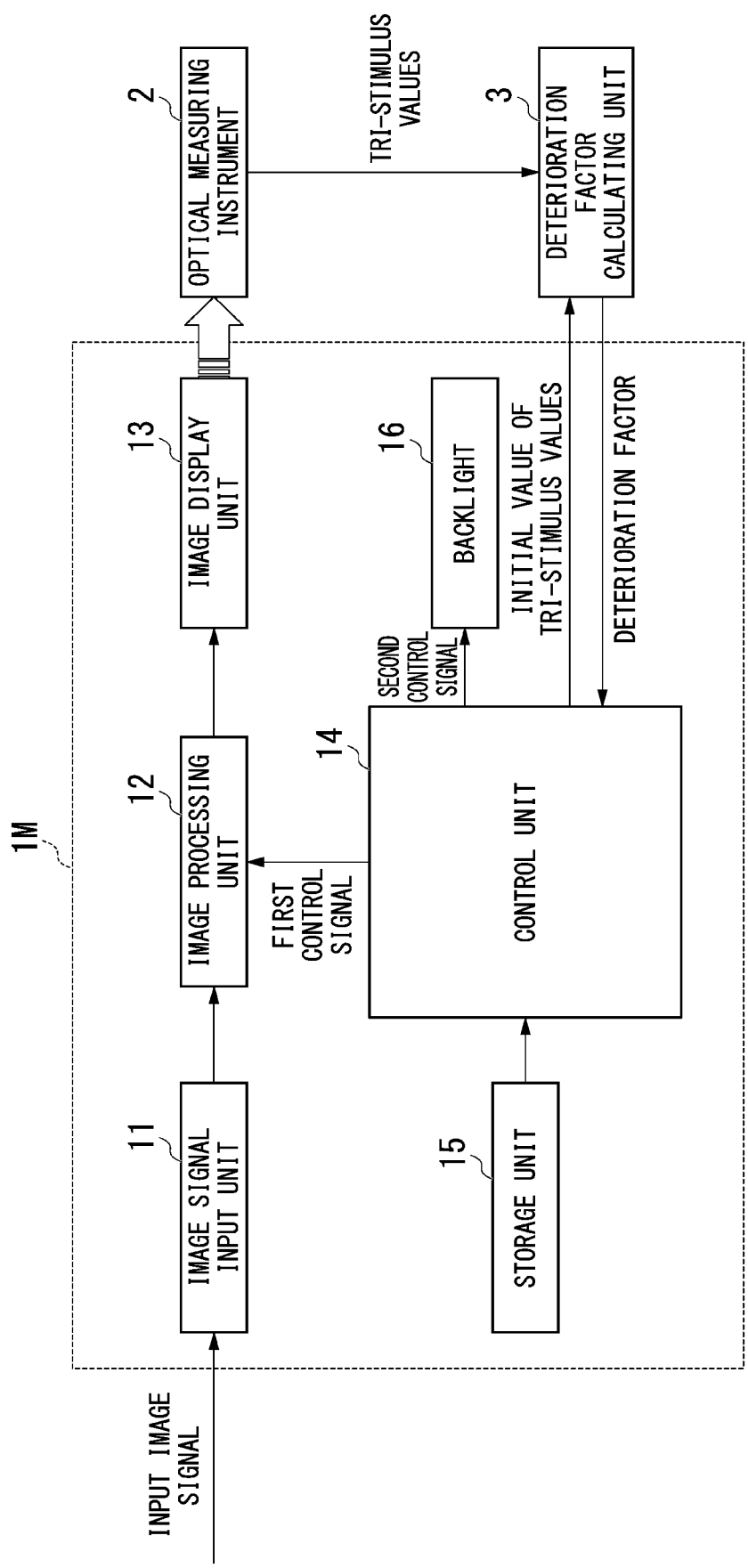
FIG. 10 is a diagram illustrating an example of a relationship between a master display device, an optical measuring instrument, and a deterioration factor calculating unit in a multi-display system according to a fourth embodiment.

FIG. 10 is a diagram illustrating an example of a relationship between the master display device 1M, the optical measuring instrument 2, and the deterioration factor calculating unit 3 in the multi-display system according to the fourth embodiment.

As described above, in the example illustrated in FIG. 7, the control unit 14 includes the backlight usage time calculating unit 14A and the prediction and adjustment unit 14B.

On the other hand, in the example illustrated in FIG. 10, the control unit 14 does not include the backlight usage time calculating unit 14A and the prediction and adjustment unit 14B.

A fifth embodiment of the multi-display system and the method of adjusting a multi-display system according to the invention will be described below with reference to the accompanying drawings.

Figure 11:
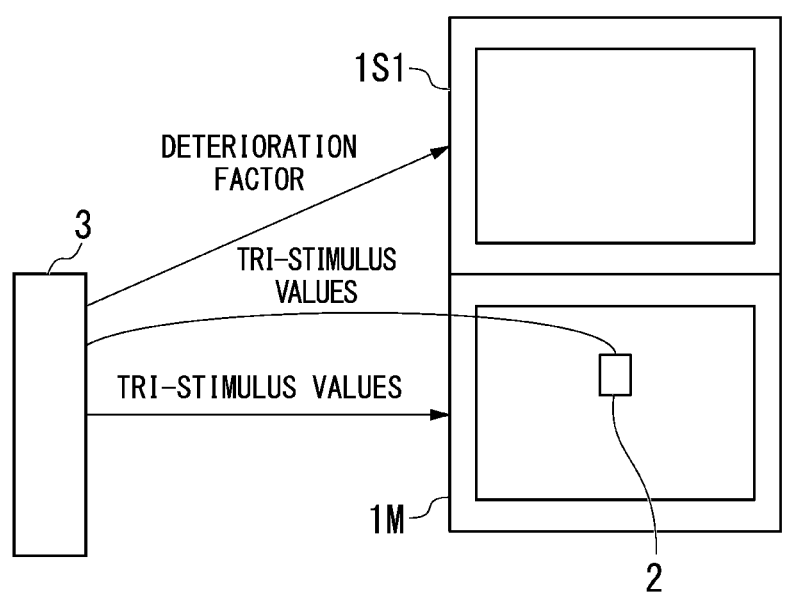
FIG. 11 is a diagram illustrating a multi-display system according to a fifth embodiment.

FIG. 11 is a diagram illustrating a multi-display system according to the fifth embodiment.

As illustrated in FIG. 11, the multi-display system according to the fifth embodiment includes a master display device 1M constituting a part of the multi-display system, a slave display device 1S1 constituting another part of the multi-display system, an optical measuring instrument 2 that measures luminance and color which are displayed by an image display unit of the master display device 1M, and a deterioration factor calculating unit 3 that calculates deterioration factors γx, γy, and γz on the basis of tri-stimulus values X1, Y1, and Z1 of the image display unit of the master display device 1M which are parameters that represent the luminance and the color measured by the optical measuring instrument 2 and initial values X0, Y0, and Z0 of the tri-stimulus values which are the measurement parameters of the image display unit of the master display device 1M.

The master display device 1M performs adjustment of the master display device 1M on the basis of the tri-stimulus values X1, Y1, and Z1 which are the measurement parameters of the image display unit of the master display device 1M.

The slave display device 1S1 performs adjustment of the slave display device 1S on the basis of the deterioration factors γx, γy, and γz calculated by the deterioration factor calculating unit 3 and the tri-stimulus values X1a, Y1a, and Z1a which are the measurement parameters of the image display unit of the slave display device 1S1 calculated from the initial values X0a, Y0a, and Z0a of the tri-stimulus values which are the measurement parameters of the image display unit of the slave display device 1S1.

While embodiments of the invention have been described above, the invention is not limited to the embodiments and can be subjected to various modifications and replacements without departing from the gist of the invention. The configurations described in the aforementioned embodiments and examples may be appropriately combined.

Some or all of the functions of the constituent units of the multi-display systems according to the aforementioned embodiments may be realized by recording a program for realizing the functions on a computer-readable recording medium and causing a computer system to read and execute the program recorded on the recording medium. The "computer system" mentioned herein may include an operating system (OS) or hardware such as peripherals.

Examples of the "computer-readable recording medium" include a portable medium such as a flexible disk, a magneto-optical disc, a ROM, or a CD-ROM and a storage device such as a hard disk incorporated in the computer system. The "computer-readable recording medium" may include a medium that dynamically holds a program for a short time like a communication line when a program is transmitted via a network such as the Internet or a communication circuit such as a telephone circuit and a medium that holds a program for a predetermined time like a volatile memory in a computer system serving as a server or a client in that case. The program may serve to realize some of the aforementioned functions. The program may serve to realize the aforementioned functions in combination with another program stored in advance in the computer system.

REFERENCE SIGNS LIST

1M . . . Master display device
11 . . . Image signal input unit
12 . . . Image processing unit
13 . . . Image display unit
14 . . . Control unit
14A . . . Backlight usage time calculating unit
14B . . . Prediction and adjustment unit
15 . . . Storage unit
16 . . . Backlight
1S1, 1S2, 1S3 . . . Slave display device
2 . . . Optical measuring instrument
3 . . . Deterioration factor calculating unit
4 . . . Deterioration factor transmitting receiving unit

What is claimed is:

1. A multi-display system comprising:
a master display device;
a first slave display device that is different from the master display device;
an optical measuring instrument configured to measure luminance and color which are displayed by a first image display unit of the master display device; and
a deterioration factor calculating device configured to calculate a deterioration factor on the basis of a first set of measurement parameters of the first image display unit of the master display device; where the first set of measurement parameters are parameters that represent the luminance and the color measured by the optical measuring instrument, and of initial values of the first set of measurement parameters of the first image display unit of the master display device,
wherein the master display device is configured to perform adjustment of the master display device on the basis of the first set of measurement parameters of the first image display unit of the master display device, and
wherein the first slave display device is configured to perform adjustment of the first slave display device on the basis of a second set of measurement parameters of a second image display unit of the first slave display device, wherein the second set of measurement parameters are calculated from the deterioration factor calculated by the deterioration factor calculating device and from initial values of the second set of measurement parameters of the second image display unit of the first slave display device.

2. The multi-display system according to claim 1, further comprising a second slave display device, wherein the second slave display device is configured to perform adjustment of the second slave display device on the basis of a third set of measurement parameters of an image display unit of the second slave display device, where the third set of measurement parameters are calculated from the deterioration factor that has been calculated by the deterioration factor calculating device and from initial values of the third set of measurement parameters of the image display unit of the second slave display device.

3. The multi-display system according to claim 1, wherein the master display device comprises:
an image signal input device configured to receive an input of an image signal;
an image processing device configured to process the image signal, received by the image signal input device, to generate an image display data, and to allow the image display unit of the master display device to display an image from the image display data generated by the image processing device;
a control device configured to generate a first control signal for controlling the image processing device and to transmit the first control signal to the image processing device, and the control device configured to generate a second control signal;
a storage device that stores the initial values of the first set of measurement parameters of the image display unit of the master display device; and
a backlight that is controllable by the second control signal generated by the control device and that is configured to light the image display unit of the master display device,
wherein the control device is configured to generate the first control signal and the second control signal on the basis of the deterioration factor calculated by the deterioration factor calculating device, and
wherein the storage device stores the deterioration factor calculated by the deterioration factor calculating device.

4. The multi-display system according to claim 3, wherein the control device includes the deterioration factor calculating device.

5. The multi-display system according to claim 4, further comprising:
a deterioration factor transmitting receiving device configured to receive, from the master display device, the deterioration factor that has been calculated by the deterioration factor calculating device, and the deterioration factor transmitting receiving device configured to transmit the received deterioration factor to the first slave display device and the second slave display device.

6. The multi-display system according to claim 5, wherein the control device is configured to receive, from the deterioration factor transmitting receiving device, the first set of measurement parameters of the image display unit of the master display device.

7. The multi-display system according to claim 3, wherein the deterioration factor calculating device interpolates the deterioration factor, which is calculated on the basis of the measurement parameters of the image display unit of the master display device and the initial values of the measurement parameters of the image display unit of the master display device, on the basis of a usage time of the backlight.

8. The multi-display system according to claim 7, wherein at least one of the master display device, the first slave display device, and the second slave display device is configured to predict and adjust at least one of luminance and color shift on the basis of a deterioration coefficient that has been interpolated on the basis of a usage time of the backlight between timings of performing adjustment of the at least one of the master display device, the first slave display device, and the second slave display device.

9. The multi-display system according to claim 1, wherein the deterioration factor calculating device is separate from the master display device.

10. The multi-display system according to claim 9, wherein the deterioration factor calculating device is configured to receive, from the optical measuring instrument, the first set of measurement parameters of the first image display unit of the master display device, where the first set of measurement parameters are measured by the optical measuring instrument, and the deterioration factor calculating device is configured to transmit the first set of measurement parameters received to the master display device.

11. A method of adjusting a multi-display system including a master display device and a first slave display device, the method comprising:
measuring luminance and color which are displayed by a first image display unit of a master display device;
calculating a deterioration factor on the basis of a first set of measurement parameters of the first image display unit of the master display device, where the first set of measurement parameters are parameters that represent the luminance and the color measured and of initial values of the first set of measurement parameters of the first image display unit of the master display device,
performing adjustment of the master display device on the basis of the first set of measurement parameters of the first image display unit of the master display device;
calculating a second set of measurement parameters of a second image display unit of the first slave display device on the basis of the deterioration factor calculated and of initial values of the second set of measurement parameters of the image display unit of the first slave display device; and
performing adjustment of the first slave display device on the basis of the second set of measurement parameters of the image display unit of the slave display device.

* * * * *